(No Model.)
J. SCHNEIBLE.
PRESSURE REGULATOR.
No. 559,221.  Patented Apr. 28, 1896.
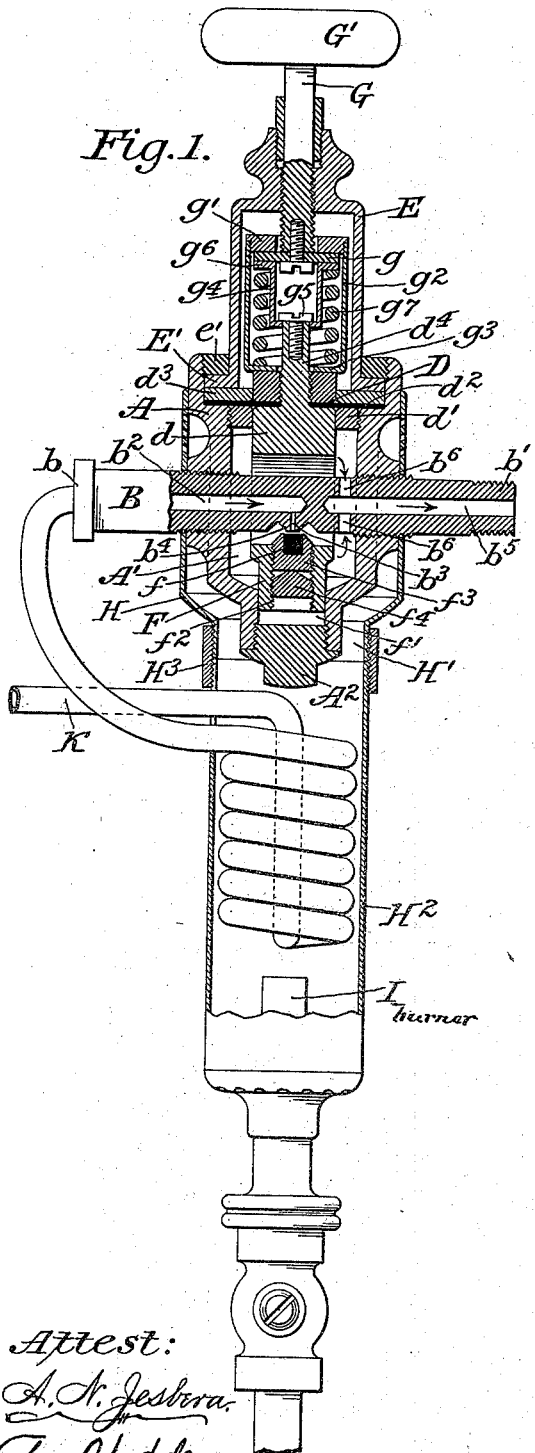
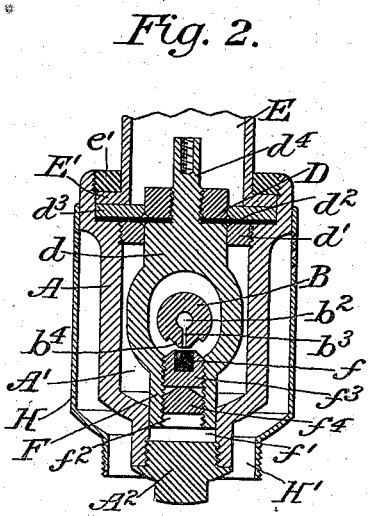
Attest:
A. N. Jesbra
A. Endder
Inventor:
Joseph Schneible
by William B. Greeley
Att'y.

UNITED STATES PATENT OFFICE.

JOSEPH SCHNEIBLE, OF BROOKLYN, NEW YORK, ASSIGNOR TO THE JOSEPH SCHNEIBLE COMPANY, OF JERSEY CITY, NEW JERSEY.

PRESSURE-REGULATOR.

SPECIFICATION forming part of Letters Patent No. 559,221, dated April 28, 1896.

Application filed May 2, 1894. Serial No. 509,765. (No model.)

*To all whom it may concern:*

Be it known that I, JOSEPH SCHNEIBLE, of Brooklyn, in the county of Kings and State of New York, have invented certain new and useful Improvements in Pressure-Regulators; and I do hereby declare that the following is a full and exact description thereof, reference being had to the accompanying drawings, and to the letters of reference marked thereon, making a part of this specification.

This invention relates to pressure regulators or valves which are designed to control automatically the flow of fluids, and particularly the valves of this general character which are intended for use with fluids under very high pressure, such as compressed carbon dioxid, the great expansion of which when released from pressure produces a considerable reduction of temperature. The principal objects in view are to increase the efficiency of such valves, to enable them to be regulated easily, so that an even and regular flow of fluid may be secured at any desired pressure, to reduce the liability of clogging by reason of the intense cold produced by the expansion of the gas, and generally to simplify and improve the construction.

The several features wherein the invention consists will be described hereinafter, and particularly pointed out in the claims.

In the accompanying drawings, Figure 1 is a vertical central section of a valve embodying my present improvements and adapted for use with compressed carbon dioxid. Fig. 2 is a partial central section on a plane at right angles to that of Fig. 1.

At A in the accompanying drawings is represented an integral casting which forms the shell or body of the valve or pressure regulator and incloses within it a chamber A'. Through suitable screw-threaded apertures in the sides of the shell A is passed a section of tubing B, which is adapted to be coupled at one end, as at $b$, to the tube or hose which conducts the gas or other fluid to the valve, and at the other end, as at $b'$, is adapted to be coupled to the tube or hose which conducts the gas away from the valve. The section of tubing B has an axial bore $b^2$, which extends through the tube and communicates with the interior of the shell or body A through a lateral opening $b^3$, which terminates in a nipple $b^4$, formed on the under side of the tube. The other end of the tube B is likewise provided with an axial bore $b^5$, which communicates freely with the interior of the chamber A' through lateral openings $b^6$ $b^6$.

The upper end of the chamber A' is closed by a movable composite diaphragm D, which yields with the varying pressure of gas within the chamber A', and regulates the flow of gas through the lateral orifice $b^3$ by means presently to be described. The diaphragm referred to combines in itself certain of the qualities of a simple flexible diaphragm and of a movable piston, while avoiding the objections which are incident to the use of either by itself. It comprises a piston or plunger $d$, which is adapted to move with a snug sliding fit in a bearing therefor, which is formed in the present instance by a ring $d'$, which is screwed into the upper end of the shell A. Above this is placed a sheet of flexible material $d^2$, such as rubber, the edges of which are clamped down firmly upon a shoulder formed upon the upper end of the shell A or upon the ring $d'$ before referred to.

As represented in the drawings, the edge of the flexible diaphragm is held to its seat by a ring $d^3$, which is held in place by means hereinafter referred to. The diaphragm is also preferably clamped upon the head of the piston or plunger $d$ by an opposing ring, which is secured upon the stem $d^4$ of the plunger, and which also has a snug sliding fit in the ring $d^3$, so that the sheet of yielding flexible material is virtually clamped between the two parts of a solid piston, for which it forms an absolutely tight backing, while permitting movement thereof to the extent and with the freedom requisite. In the construction represented in the drawings, a cap E, having a flange E', rests upon the ring $d^3$ and is clamped in place by a screw-threaded ring $e'$.

The piston $d$ is extended to form a valve-stem F, which loosely encircles the tube B and carries the valve-plug $f$, which is adapted to close the inlet $b^3$, or to move away from the same more or less to permit the proper flow of the gas into the chamber A'. The lower end of the valve-stem F is guided in a recess $f'$, formed in the lower end of the shell A, and is formed with a screw-threaded hole $f^2$, in which is placed a screw-plug $f^3$, which supports the valve-plug proper, $f$. A locking-nut $f^4$ may also be added to prevent improper movement of the plug $f^3$. The lower end of the chamber A' is closed by a plug $A^2$, which can be removed to permit the withdrawal of the screw-plug $f^3$ with the valve-seat $f$ for cleaning or replacing the latter, without requiring the regulator to be taken entirely apart.

It will be understood from the foregoing description that when the pressure within the chamber A' is sufficiently great the composite diaphragm D will be raised and the valve-plug $f$ will be held against the inlet $b^3$ to prevent the entrance of gas into the chamber A', and that when the pressure decreases sufficiently to permit the diaphragm to descend, the valve-plug $f$ will be moved away from the inlet and the fluid again be allowed to enter the chamber A', from which it escapes through the discharge-opening. It is desirable to provide means whereby the pressure at which the valve shall open or close may be varied, and accordingly I have provided means whereby pressure may be applied to either side of the diaphragm D at will. For this purpose the cap E receives a threaded rod G, having a knob or handle G'. The lower end of the rod G is provided with a flange $g$, which may be formed by securing a disk upon the end of the rod. Upon the flange $g$ rests a ring $g'$, to which is secured a casing $g^2$, having its lower end turned in to form a flange $g^3$. An inner sleeve $g^4$ engages the stem of the piston or plunger through the head of a screw $g^5$ and has at its upper end an outwardly-turned flange $g^6$. A spring $g^7$ is interposed between the flange $g^6$ of the sleeve $g^4$ and the flange $g^3$ of the sleeve of casing $g^2$. By rotating the handle G' to advance or retire the rod G the spring $g^7$ is compressed in the one case, through the flange $g$, the flange $g^6$, and the flange $g^3$, to exert a downward pressure upon the diaphragm D, and in the other case, through the flange $g$, the ring $g'$, the sleeve $g^2$, the flange $g^3$, the flange $g^6$, the sleeve $g^4$, and the stem of the piston or plunger, to exert an upward tension upon the diaphragm. Through these means the action of the diaphragm can be regulated to open or close the valve at any desired pressure.

It has been found in practice in using valves of this description with carbon dioxid which has been compressed under great pressure that the sudden expansion of the gas as it issues into the chamber from the inlet-valve causes sometimes an accumulation of frost between the valve-plug and its seat, which interferes with the proper action of the valve. This might be prevented by reducing the pressure more gradually, as by passing the gas through a succession of valves; but this plan is of course objectionable on account of the expense involved. I accomplish in the present case the desired result by rarefying the gas before it reaches the chamber of the valve, and for this purpose I heat the supply-tube before it reaches the inlet. In the arrangement shown in the drawings I accomplish this result and at the same time keep the body of the valve somewhat warm by the use of a single heater. As represented, a casing H is fitted to the shell or body A and is extended below it to receive in its lower end a burner I. Preferably the casing is made of two sections H' and $H^2$, united by a coupling-sleeve $H^3$. The supply-tube K is introduced into the casing and is bent down, so that it may stand in the hottest part of the flame of the burner. The tube is then coiled spirally, so that a suitable length of the tube may be included within the casing, and is then coupled to the tube B of the valve. By this device the gas is rarefied before it reaches the valve proper and its temperature is also somewhat increased, with the result that the accumulation of frost within the body of the valve is prevented.

I claim as my invention—

1. The combination of a shell or body having an internal chamber and provided with an inlet and outlet into and from said chamber, a valve-plug to regulate the flow of liquid through said chamber, means to support and adjust said valve-plug, a casing fitted to said shell or body and a heater placed within said casing, substantially as shown and described.

2. The combination of a shell or body having an internal chamber, an inlet through which gas is admitted to said chamber, an outlet from said chamber, a diaphragm moving with the varying pressure of the gas in said chamber, a valve-plug supported by said diaphragm and adapted to control the flow through said inlet, a tube to conduct the gas to said inlet, and means to heat said tube and to rarefy the gas therein on its way to said inlet, substantially as shown and described.

3. The combination of a shell or body having a chamber, an inlet through which gas is admitted to said chamber, an outlet from said chamber, a diaphragm movable with the varying pressure of the gas in said chamber, a valve-plug supported by said diaphragm and adapted to control the flow through said inlet, a casing fitted to said shell, a heater placed in said casing, and a tube to conduct the gas to said inlet, said tube being carried into said casing into proximity to the heater and being coiled within the casing and then being connected to said inlet, substantially as shown and described.

In testimony whereof I have signed my name to this specification in the presence of two subscribing witnesses.

JOSEPH SCHNEIBLE.

Witnesses:
W. B. GREELEY,
A. N. JESBERA.